US010040448B2

(12) United States Patent
Dudar

(10) Patent No.: US 10,040,448 B2
(45) Date of Patent: Aug. 7, 2018

(54) SYSTEMS AND METHODS FOR DETECTION AND MITIGATION OF LIQUID FUEL CARRYOVER IN AN EVAPORATIVE EMISSIONS SYSTEM

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/939,672

(22) Filed: Nov. 12, 2015

(65) Prior Publication Data

US 2017/0137022 A1     May 18, 2017

(51) Int. Cl.
*B60W 20/50*     (2016.01)
*B60W 50/14*     (2012.01)
(Continued)

(52) U.S. Cl.
CPC .............. *B60W 20/50* (2013.01); *B60K 6/24* (2013.01); *B60K 6/26* (2013.01); *B60K 6/40* (2013.01);
(Continued)

(58) Field of Classification Search
CPC ........... F02M 25/0854; F02M 25/0872; F02M 2025/0881; B01D 2259/40086; B01D 2259/4145; B01D 2259/4516; B01D 53/0438; B60K 15/035; B60K 15/03504; B60K 15/03519; F17C 13/025; F17C 2223/0161; Y10T 137/86332

USPC .............. 123/516, 519, 520; 141/1, 59, 198; 475/128, 221; 137/202, 588; 62/48.1, 62/49.1; 95/90
See application file for complete search history.

(56) References Cited

U.S. PATENT DOCUMENTS 4,887,578 A * 12/1989 Woodcock ....... B60K 15/03504
                                                                                                                                                                                                   123/516
5,655,577 A * 8/1997 Loen ..................... B67D 7/048
                                                                                                                                                                                                                     141/198

(Continued)

OTHER PUBLICATIONS

Dudar, Aed M. et al., "Systems and Methods for Detection and Mitigation of Liquid Fuel Carryover in an Evaporative Emissions System," U.S. Appl. No. 14/795,558, filed Jul. 9, 2015, 42 pages.
(Continued)

*Primary Examiner* — Anne M Antonucci
*Assistant Examiner* — Sanjeev Malhotra
(74) *Attorney, Agent, or Firm* — Julia Voutyras; McCoy Russell LLP

(57) ABSTRACT

Methods and systems are provided for detecting and mitigating the presence of liquid fuel carryover in an evaporative emissions control system of a vehicle in response to a refueling event. In one example, an electric motor is operated to spin a vehicle engine unfueled in reverse in order to pressurize the evaporative emissions system and the fuel system responsive to an indication of liquid fuel in the vapor recovery lines. In this way, indication of liquid fuel carryover following a refueling event may be quickly diagnosed, and mitigating actions may be taken to ensure liquid fuel is returned to the tank prior to contacting the adsorbent material within the vapor canister.

16 Claims, 6 Drawing Sheets

(51) Int. Cl.

| | | |
|---|---|---|
| *B60K 15/03* | (2006.01) | |
| *B60K 6/442* | (2007.10) | |
| *B60K 6/24* | (2007.10) | |
| *B60K 6/40* | (2007.10) | |
| *B60W 10/06* | (2006.01) | |
| *B60W 10/08* | (2006.01) | |
| *B60K 6/26* | (2007.10) | |
| *F02M 25/08* | (2006.01) | |
| *F02D 13/02* | (2006.01) | |
| *F02D 15/00* | (2006.01) | |
| *F02D 29/02* | (2006.01) | |
| *F02D 41/00* | (2006.01) | |

(52) U.S. Cl.
CPC .............. *B60K 6/442* (2013.01); *B60K 15/03* (2013.01); *B60W 10/06* (2013.01); *B60W 10/08* (2013.01); *B60W 50/14* (2013.01); *F02D 13/0203* (2013.01); *F02D 15/00* (2013.01); *F02D 29/02* (2013.01); *F02D 41/0035* (2013.01); *F02M 25/089* (2013.01); *B60K 2015/0319* (2013.01); *B60K 2015/03217* (2013.01); *B60K 2015/03296* (2013.01); *B60K 2015/03328* (2013.01); *B60W 2560/00* (2013.01); *B60Y 2200/92* (2013.01); *Y02T 10/18* (2013.01); *Y10S 903/905* (2013.01); *Y10S 903/93* (2013.01); *Y10S 903/951* (2013.01)

(56) References Cited

U.S. PATENT DOCUMENTS

| | | | | |
|---|---|---|---|---|
| 6,077,182 | A * | 6/2000 | Long | F16H 61/12 475/128 |
| 6,763,298 | B2 | 7/2004 | Boggs et al. | |
| 8,739,766 | B2 | 6/2014 | Jentz et al. | |
| 2002/0157715 | A1 * | 10/2002 | Viebahn | B60K 15/035 137/588 |
| 2003/0221433 | A1 * | 12/2003 | Gustafson | F17C 5/06 62/48.1 |
| 2006/0032546 | A1 * | 2/2006 | Bolle | F02M 25/0872 141/59 |
| 2007/0131204 | A1 | 6/2007 | Chae | |
| 2007/0186976 | A1 * | 8/2007 | Hilderley | B60K 15/035 137/202 |
| 2007/0266997 | A1 * | 11/2007 | Clontz, Jr. | B01D 53/0438 123/519 |
| 2008/0041226 | A1 * | 2/2008 | Hiltzik | B01D 53/0438 95/90 |
| 2010/0212772 | A1 * | 8/2010 | Allidieres | F17C 5/007 141/1 |
| 2011/0045931 | A1 * | 2/2011 | Raghavan | B60K 6/365 475/221 |
| 2012/0073549 | A1 * | 3/2012 | Lee | B01D 53/0415 123/520 |
| 2012/0118273 | A1 * | 5/2012 | Kim | F02M 25/0854 123/520 |
| 2013/0031889 | A1 * | 2/2013 | Roos | F01N 9/00 60/274 |
| 2014/0074385 | A1 | 3/2014 | Dudar et al. | |
| 2014/0326000 | A1 * | 11/2014 | Sampson | F17C 13/025 62/49.1 |
| 2015/0166037 | A1 * | 6/2015 | Bergkoetter | F02D 13/06 477/181 |
| 2015/0211469 | A1 * | 7/2015 | Ghoneim | F02N 11/0825 701/113 |

OTHER PUBLICATIONS

Dudar, Aed M., "System and Methods for Purging Residual Exhaust and Uncombusted Fuel to an Exhaust Catalyst," U.S. Appl. No. 14/701,094, filed Apr. 30, 2015, 52 pages.

Dudar, Aed M., "System and Methods for Preventing Hydrocarbon Breakthrough Emissions," U.S. Appl. No. 14/860,421, filed Sep. 21, 2015, 51 pages.

Dudar, Aed M., "System and Methods for Purging Residual Exhaust and Uncombusted Fuel to a Fuel Vapor Canister," U.S. Appl. No. 14/810,177, filed Jul. 27, 2015, 48 pages.

* cited by examiner

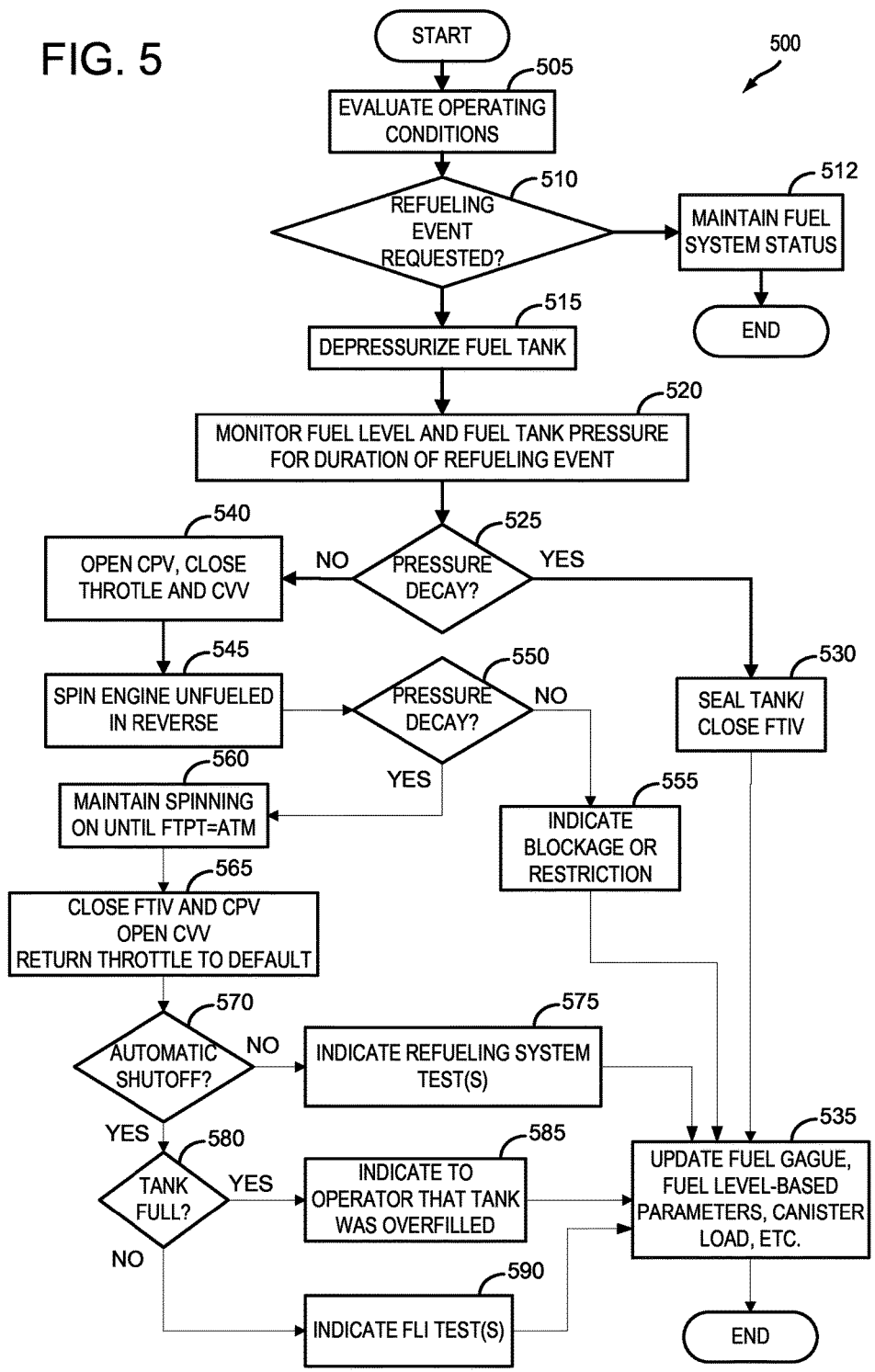

SYSTEMS AND METHODS FOR DETECTION AND MITIGATION OF LIQUID FUEL CARRYOVER IN AN EVAPORATIVE EMISSIONS SYSTEM

FIELD

The present description relates generally to methods and systems for controlling a vehicle fuel system to prevent liquid fuel from entering a fuel vapor canister.

BACKGROUND/SUMMARY

Vehicles with an internal combustion engine may be fitted with fuel vapor recovery systems (vapor storage systems) wherein vaporized hydrocarbons (HCs) released from a fuel tank are captured and stored in a fuel vapor canister containing a quantity of fuel-absorbing material such as activated charcoal. Eventually, the fuel vapor canister may become filled with an amount of fuel vapor. The fuel canister may be cleared of fuel vapor by way of a purging operation. A fuel vapor purging operation may include opening a purge valve to introduce the fuel vapor into the cylinder(s) of the internal combustion engine for combustion so that fuel economy may be maintained and fuel vapor emissions may be reduced.

Activated charcoal has been found to be a suitable fuel vapor adsorbing material to be used in such a canister device because of its extremely porous structure and very large surface area to weight ratio. However, this porous structure can lose some of its adsorption efficiency when coated with liquid fuel. This may occur if, for example, during refueling a pump operator adds fuel after an initial automatic shut-off. For instance, in an attempt to maximize the amount of fuel pumped into the tank, a pump operator may dispense additional fuel in what is commonly referred to as "trickle-filling", If liquid has entered the fuel vapor recovery lines (evap recovery lines) and a purge cycle is commanded at the next engine start, the liquid can get sucked into the canister and corrupt the activated carbon. This may lead to increased HC emissions. Additionally, if liquid fuel in the canister or purge line is purged to the intake, a reduction of engine power may result from an extremely low air-fuel ratio (A/F). Further, HC emissions from the engine exhaust may increase from the low air-fuel ratio (A/F). Accordingly, it is desired to easily diagnose and mitigate the presence of liquid fuel in the evap recovery lines.

Toward this end, US Patent Application US 2007/0131204 A1 teaches a method of detecting whether liquefied fuel exists in a canister purge line based on a fuel level in a fuel tank higher than a pre-set level. If the fuel level is greater than a pre-set level, an air ratio is measured by an oxygen sensor in the exhaust manifold. The purge control valve is then opened for a pre-set time period, the air ratio is measured again, and a difference is calculated between the two. If the difference is less than or equal to a first value, and the air-fuel ratio after opening the purge control valve is less than or equal to a second value, then it is deemed that liquefied fuel exists in the canister purge line. If liquefied fuel is deemed to exist in the canister purge line, the purge control valve may be closed for a pre-set time period. Thus, loss of engine power due to a low A/F caused by liquefied fuel in the canister purge line is prevented by detecting liquefied fuel in the canister purge line in advance. However, the inventors herein have recognized potential issues with such a method. For example, the method is such that detection of fuel in the canister purge line does not alleviate or prevent the possibility of vapor canister adsorption degradation due to liquid in the vapor canister. Further, the method does not provide mitigating actions to purge liquid fuel from the evap recovery lines. An attractive alternative therefore, is a method that includes both detection and mitigation of fuel carryover in the evap line(s), such that liquid fuel does not come into contact with the activated charcoal housed within the vapor canister.

Thus, the inventors herein have developed systems and methods to at least partially address the above issues. In one example, the issues described above may be addressed by a method for a vehicle including, during refueling a tank which supplies fuel to a combustion engine, venting the tank to atmosphere through a vapor storage system, and after refueling and when pressure decay in the tank is less than a threshold, sealing the vapor storage system from atmosphere and running the engine un-fueled in reverse to force air from an intake manifold of the engine through the vapor storage system into the tank to return liquid fuel in the evap recovery lines to the fuel tank.

As one example, pressure decay in the tank after refueling may comprise a first pressure decay rate, and pressure decay in the tank while running the engine in reverse may comprise a second pressure decay rate, wherein the engine may be continued to run in reverse responsive to the second pressure decay rate greater than another threshold until pressure in the tank decreases to atmospheric pressure. In this way, the presence of liquid fuel in the evap recovery lines may be quickly diagnosed, and mitigating action may be taken to return the fuel to the tank.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows an example method for detecting and mitigating liquid fuel carryover in the evaporative emissions system.

DETAILED DESCRIPTION

Figure 1:
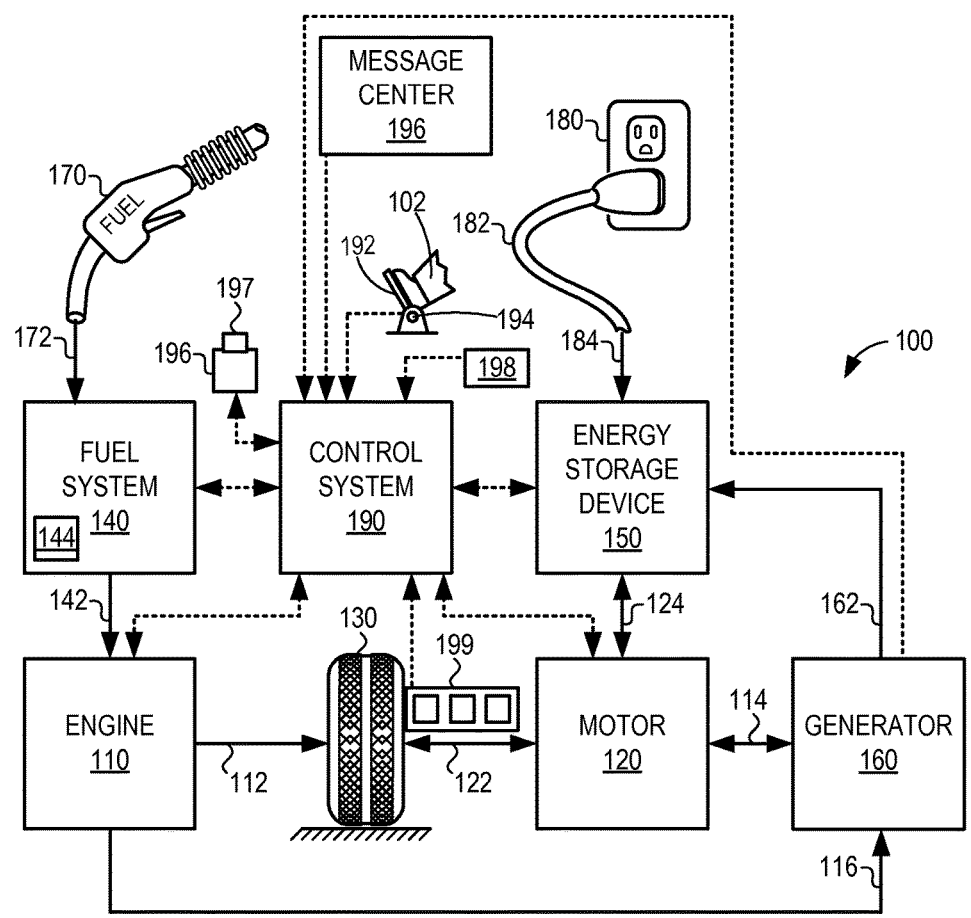
FIG. 1 schematically shows an example vehicle propulsion system.
Figure 2:
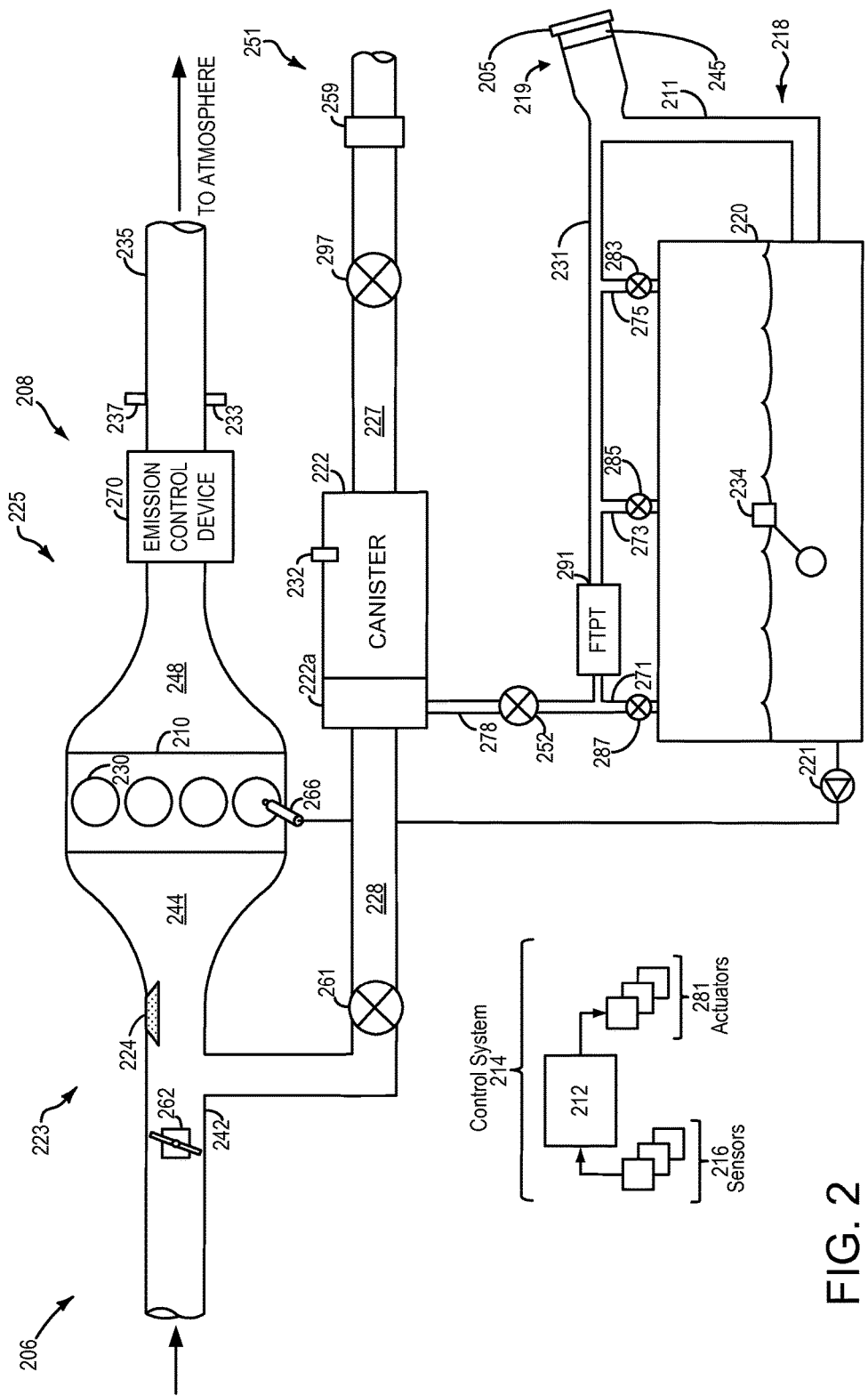
FIG. 2 schematically shows an example vehicle system with a fuel system and an evaporative emissions system.
Figure 6:
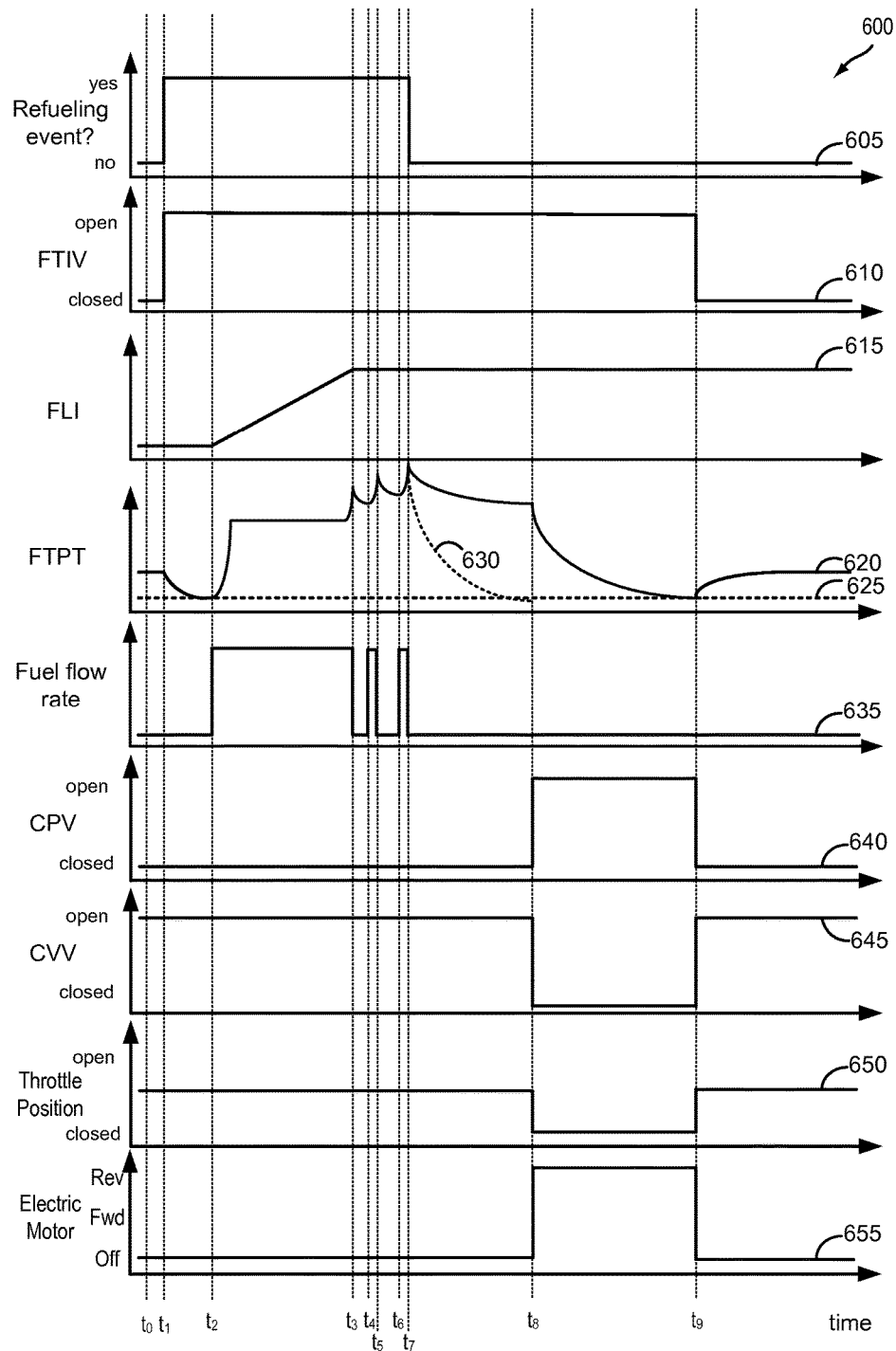
FIG. 6 shows a timeline for an example liquid fuel carryover detection and mitigation procedure.

The following detailed description relates to systems and methods for detecting and mitigating the presence of liquid fuel carryover in fuel vapor recovery (evap recovery) lines occurring while refueling a fuel tank. The fuel tank may be included in a vehicle, such as a hybrid electric vehicle, as shown in FIG. 1. The vehicle may include a fuel system and an evaporative emissions (evap) system, wherein the fuel tank is coupled to a fuel vapor canister via one or more fuel vapor recovery lines as shown in FIG. 2. During a refueling event, overfilling the fuel tank (via trickle filling, or due to a faulty automatic shut-off mechanism) can lead to liquid fuel becoming trapped in the evap recovery lines. If the liquid fuel is not purged from the evap recovery lines prior to a subsequent purge event, the liquid fuel may be drawn into the fuel vapor canister, reducing the efficiency of the adsorbent there within. As one example, purging the liquid fuel from the evap recovery lines may include pressurizing the evap system and the fuel system via spinning an engine of a hybrid electric vehicle in reverse. The engine may comprise a plurality of combustion cylinders, such as the combustion cylinder depicted in FIG. 3. The direction of the electric motor may be reversed using an H-bridge circuit, such as the circuit shown in FIGS. 4A-4B, thus allowing the engine to be spun in reverse. A method for detecting and mitigating the presence of liquid fuel in the evap recovery line(s) is depicted in FIG. 5. A timeline for detecting liquid fuel in the evap line(s) following a refueling event and returning the liquid fuel to the fuel tank using the method of FIG. 5 is shown in FIG. 6.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and a canister vent valve 297. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 5.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Evaporative emissions detection routines may be intermittently performed by controller 212 on fuel system 218 to confirm that evaporative emissions are not entering the atmosphere. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

The refueling system and evaporative emissions system may be configured to sequester fuel vapors during refueling events, and further configured to trigger the shutoff of a refueling pump when the fuel level in the fuel tank increases above a threshold. For example, a float valve may be coupled to FLVV 285, and configured to close the valve when the fuel level reaches a threshold level. This may thus prevent fuel vapor from entering vapor recovery line 231 and conduit 278, building a pressure in the fuel tank which triggers the automatic shutoff of the refueling pump. However, refueling operators may choose to "trickle fill" the fuel tank following the automatic shutoff, incrementally adding fuel to the fuel tank. If too much additional fuel is added, fuel may enter and become trapped within vapor recovery line 231 and conduit 278 (evap recovery lines). During a canister purging event, which may occur at the first engine-on event following the refueling event, the trapped liquid fuel may be drawn into the fuel vapor canister, reducing efficiency of the adsorbent. Recognizing and mitigating liquid fuel within the vapor recovery line may thus increase efficiency of the fuel vapor canister, thereby reducing emissions of the vehicle. In one example, mitigating liquid fuel within the recovery line may include pressurizing the evaporative emissions system 251 and fuel system 218 such that fuel may be returned to the fuel tank. Hybrid electric vehicles (HEVs) and plug-in hybrid electric vehicles (PHEVs) are unique in that a battery may be operated to spin the engine unfueled in forward or reverse modes. As will be described in further detail below, spinning the engine unfueled in reverse may function to pressurize the evaporative emissions system 251 and fuel system 218 via the reverse operation of the engine cylinders, thus returning fuel to the fuel tank if detected in conduit 278 and vapor recovery line 231 (evap recovery lines).

Figure 3:
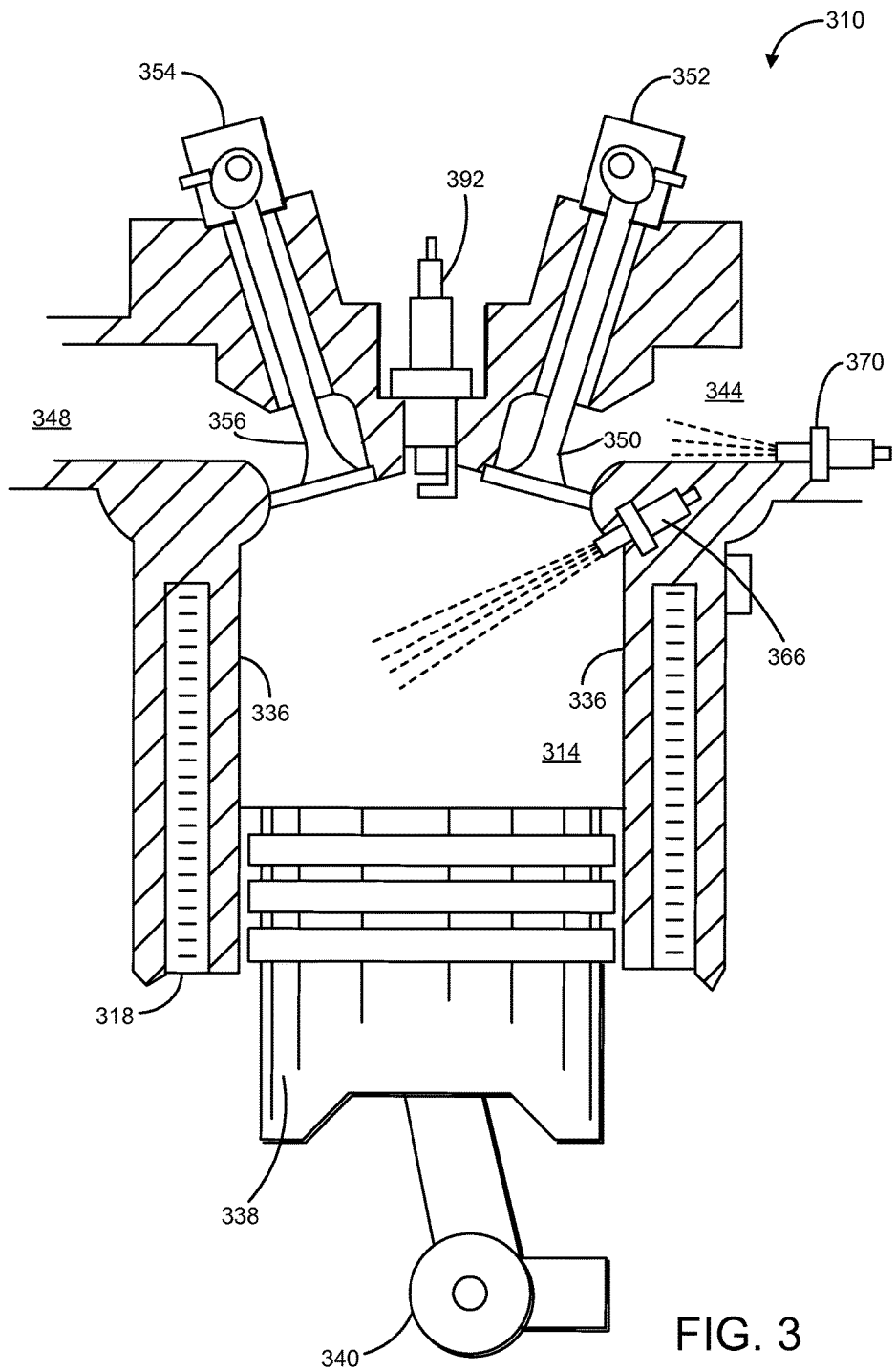
FIG. 3 schematically shows an example combustion cylinder for an engine.

FIG. 3 depicts an example embodiment of a combustion chamber or cylinder that may be included in engine 310, which may be configured similarly to engine 110 as described herein, and depicted in FIG. 1 and/or engine 210, as described herein and depicted in FIG. 2. Cylinder (i.e., combustion chamber) 314 may include combustion chamber walls 336 with piston 338 positioned therein. Piston 338 may be coupled to crankshaft 340 so that reciprocating motion of the piston is translated into rotational motion of the crankshaft. Crankshaft 340 may be coupled to at least one drive wheel of the passenger vehicle via a transmission system. Further, a starter motor may be coupled to crankshaft 340 via a flywheel to enable a starting operation of engine 310, and/or to rotate the engine in an unfueled mode.

Cylinder 314 can receive intake air via intake air passage 344, which may be one of a plurality of intake air passages coupled to cylinder 314. Intake air passage 344 may communicate with other cylinders of engine 310 in addition to cylinder 314. In some embodiments, one or more of the intake passages may include a boosting device such as a turbocharger or a supercharger. Exhaust passage 348 can receive exhaust gases from cylinder 314 as well as from other cylinders of engine 310.

Each cylinder of engine 310 may include one or more intake valves and one or more exhaust valves. For example, cylinder 314 is shown including at least one intake poppet valve 350 and at least one exhaust poppet valve 356 located at an upper region of cylinder 314. In some embodiments, each cylinder of engine 310, including cylinder 314, may include at least two intake poppet valves and at least two exhaust poppet valves located at an upper region of the cylinder.

Intake valve 350 may be controlled by a controller via actuator 352. Similarly, exhaust valve 356 may be controlled by a controller via actuator 354. During some conditions, the controller may vary the signals provided to actuators 352 and 354 to control the opening and closing of the respective intake and exhaust valves. The position of intake valve 350 and exhaust valve 356 may be determined by respective valve position sensors (not shown). The valve actuators may be of the electric valve actuation type or cam actuation type, or a combination thereof. The intake and exhaust valve timing may be controlled concurrently or any of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by a controller to vary valve operation. For example, cylinder 314 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 314 can have a compression ratio, which is the ratio of volumes when piston 338 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 310 may include a spark plug 392 for initiating combustion. An ignition system (not shown) can provide an ignition spark to cylinder 314 via spark plug 392 in response to a spark advance signal from a controller, under select operating modes. However, in some embodiments, spark plug 392 may be omitted, such as where engine 310 may initiate combustion by auto-ignition or by injection of fuel as may be the case with some diesel engines.

In some embodiments, each cylinder of engine 310 may be configured with one or more fuel injectors for providing fuel thereto. As a non-limiting example, cylinder 314 is shown including two fuel injectors 366 and 370. Fuel injector 366 is shown coupled directly to cylinder 314 for injecting fuel directly therein in proportion to a pulse width of a signal received from a controller via an electronic driver. In this manner, fuel injector 366 provides what is known as direct injection (hereafter referred to as "DI") of fuel into cylinder 314. While FIG. 3 shows injector 366 as a side injector, it may also be located overhead of the piston, such as near the position of spark plug 392. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 366 from a high pressure fuel system including a fuel tank, fuel pumps, a fuel rail, etc., as depicted in FIG. 2. Alternatively, fuel may be delivered by a single stage fuel pump at lower pressure, in which case the timing of the direct fuel injection may be more limited during the compression stroke than if a high pressure fuel system is used.

Fuel injector 370 is shown arranged in intake air passage 344, rather than in cylinder 314, in a configuration that provides what is known as port injection of fuel (hereafter referred to as "PFI") into the intake port upstream of cylinder 314. Fuel injector 370 may inject fuel in proportion to a pulse width of a signal received from a controller via an electronic driver.

Fuel may be delivered by both injectors to the cylinder during a single cycle of the cylinder. For example, each injector may deliver a portion of a total fuel injection that is combusted in cylinder 314. Further, the distribution and/or relative amount of fuel delivered from each injector may vary with operating conditions such as described herein below. The relative distribution of the total injected fuel among injectors 366 and 370 may be referred to as a first injection ratio. For example, injecting a larger amount of the fuel for a combustion event via (port) injector 370 may be an example of a higher first ratio of port to direct injection, while injecting a larger amount of the fuel for a combustion event via (direct) injector 366 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 3 shows only one cylinder of a multi-cylinder engine. As such each cylinder may similarly include its own set of intake/exhaust valves, fuel injector(s), spark plug, etc.

Fuel injectors 366 and 370 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 370 and 366, different effects may be achieved. Fuel injectors 366 and 370 may be configured to inject fuel from the same fuel tank, from different fuel tanks, from a plurality of the same fuel tanks, or from an overlapping set of fuel tanks.

When the engine is spun in the default direction, a vacuum is generated in the intake manifold, while a pressure is generated in the exhaust system. However, if the engine is spun in reverse, a vacuum is generated in the exhaust system, while a pressure is generated in the intake manifold. More specifically, as the engine spins in reverse, the opening of a cylinder exhaust valve brings fresh air and exhaust into the cylinder, and a subsequent opening of the cylinder intake valve evacuates the cylinder to the intake manifold. As described briefly above and which will be described in more detail below, a refueling operator may choose to "trickle fill" the fuel tank, and such action may result in liquid fuel entering into the evap recovery lines. Thus, spinning the engine unfueled in reverse upon an indication of liquid fuel in a vapor line may serve to pressurize the emissions control system and fuel system, thus returning liquid fuel to the fuel tank.

Figure 4A:
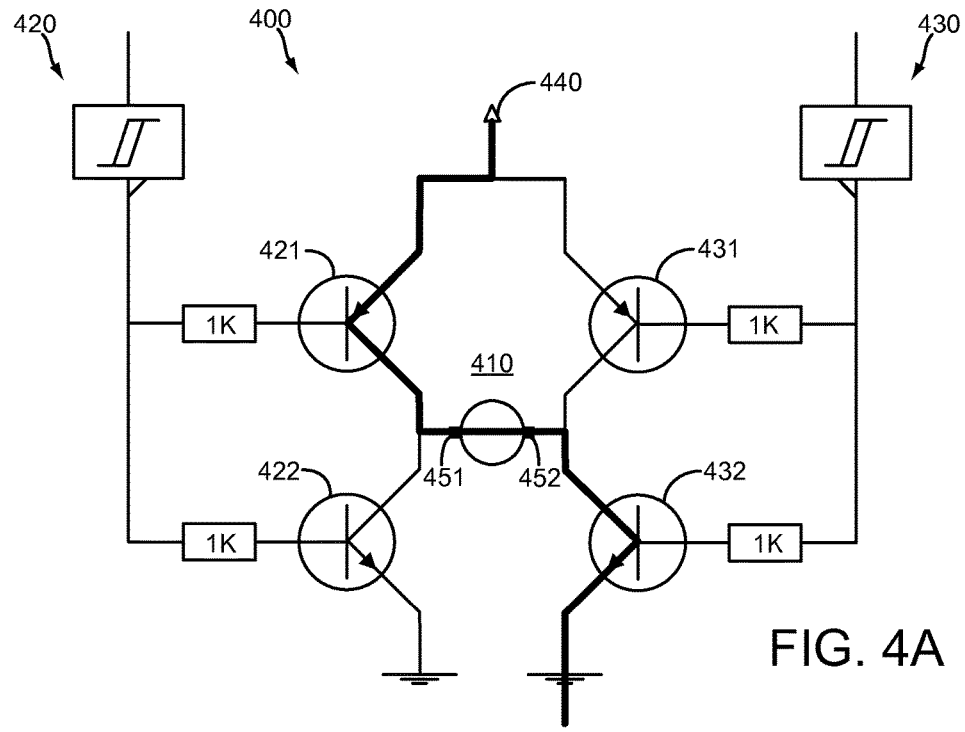
FIGS. 4A and 4B show a schematic depiction of an electronic circuit configured to reverse the spin orientation of an electric motor.
Figure 4B:
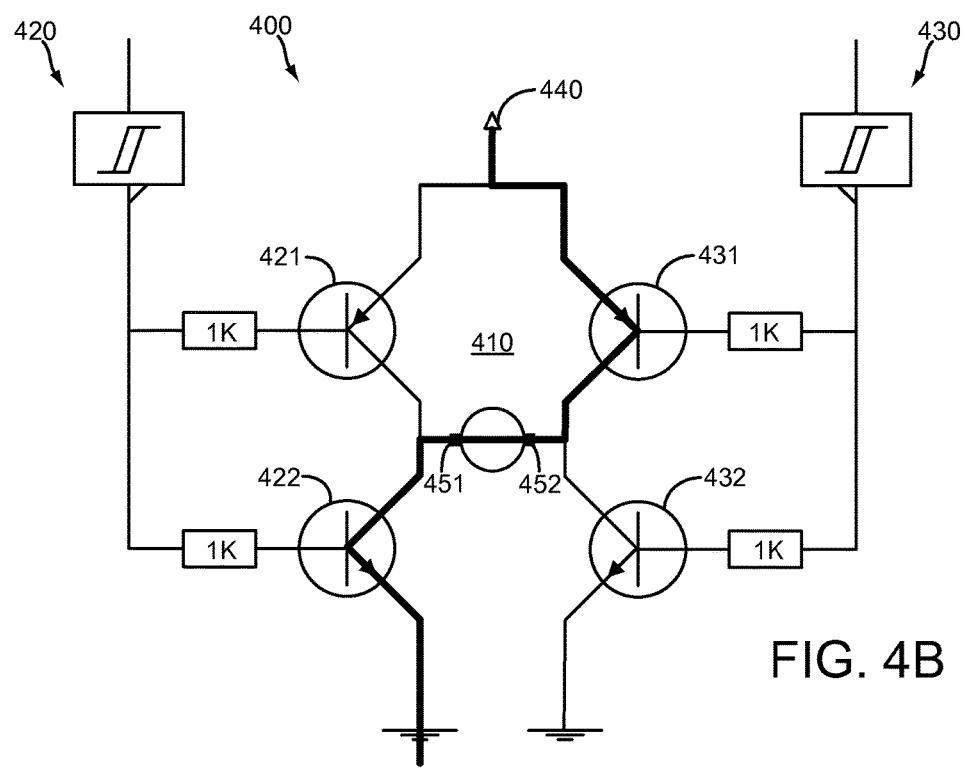

FIGS. 4A and 4B show an example circuit 400 that may be used for reversing a spin orientation of an electric motor. Circuit 400 schematically depicts an H-Bridge circuit that may be used to run a motor 410 in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated, while transistors 422 and 431 are turned off. In this confirmation, the left lead 451 of motor 410 is connected to power source 440, and the right lead 452 of motor 410 is connected to ground. In this way, motor 400 may run in a forward direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. During one or more of or each of the forward engine rotation operations, fuel vapors may also be purged to the engine with and/or without engine combustion occurring.

In FIG. 4B, transistors 422 and 431 are activated, while transistors 421 and 432 are turned off. In this confirmation, the right lead 452 of motor 410 is connected to power source 440, and the left lead 451 of motor 410 is connected to ground. In this way, motor 400 may run in a reverse direction.

A flow chart for a high-level example method 500 for a refueling liquid fuel carryover detection and mitigation strategy is shown in FIG. 5. More specifically, method 500 may be used to indicate the presence of fuel in an evap recovery line following a refueling event, and if fuel is detected, actively return the fuel to the fuel tank. Method 500 will be described with reference to the systems described herein and shown in FIGS. 1-4, and may be stored at the controller as executable instructions in non-transitory memory. Briefly, method 500 includes, during a first condition, spinning an engine unfueled in reverse to pressurize the fuel system responsive to a first fuel tank pressure decay rate being less than a threshold, and responsive to a second fuel tank pressure decay rate being greater than a threshold, maintaining the spinning the engine in reverse until the fuel tank pressure decreases to atmospheric pressure.

Method 500 begins at 505 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 510, method 500 includes indicating whether a refueling event has been requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. If a refueling event has not been requested, the method 500 proceeds to 512, wherein method 500 includes maintaining the status of the fuel system, and may further include maintaining the status of the evaporative emissions system. For example, components such as the FTIV, CVV, CPV, fuel pump, and refueling lock may be signaled by the controller to maintain their current conformation and/or activity. Method 500 may then end.

If a request for refueling is received, method 500 proceeds to 515. At 515, method 500 includes depressurizing the fuel tank. For example, the controller 212 may open a fuel tank isolation valve (such as FTIV 252) and open or maintain open a vent path between the fuel vapor canister and atmosphere (e.g., open CVV), while maintaining a canister purge valve (e.g., CPV 261) closed, to depressurize the fuel tank before allowing enabling fuel to be added therein. The fuel tank isolation valve may be opened in a manner to depressurize the fuel tank at a predetermined rate, so as to prevent rapid depressurization (e.g., FLVV and GVV, which may cork shut due to rapid depressurization). A refueling lock, such as refueling lock 245, may be maintained locked until the fuel tank pressure decreases to a threshold pressure (e.g., atmospheric pressure), and then commanded to unlock, thus allowing access to the fuel filler neck only following fuel tank depressurization. The fuel tank isolation valve and canister vent path may be maintained open for the duration of the refueling event, to allow refueling vapors to be flowed to the fuel vapor canister, and to allow gasses stripped of refueling vapors to be flowed to atmosphere.

Continuing at 520, method 500 includes monitoring fuel level via a fuel tank fill level sensor and fuel tank pressure (FTP) via a fuel tank pressure sensor (e.g. FTPT 291) for the duration of the refueling event. Monitoring FTP may include receiving signals from one or more fuel tank pressure sensors continuously, or at predetermined time intervals such that a predetermined number of fuel tank pressure measurements can be performed over the duration of the refueling event. The predetermined number of fuel tank pressure measurements and the predetermined time intervals may be set depending on a noise characteristic of the sensor and/or fuel tank pressure signal, for example. In one example, the predetermined time interval may be 5 seconds or 10 seconds, or frequent enough to collect a reliable number of pressure measurements representative of the FTP dynamics typically observed during refueling. As another example, the predetermined time interval or predetermined number of fuel tank pressure measurements may be set large enough to reliably measure a rate of change in fuel tank pressure due to a refueling event. Similarly, monitoring fuel level may include the control system receiving information regarding the level of fuel stored in the fuel tank via one or more fuel level sensors, either continuously or at predetermined intervals over the duration of the refueling event. The end of the refueling event may be indicated based on one or more of the fuel tank pressure and fuel level. For example, the end of the refueling event may be indicated when a fuel level has plateaued for a duration, and when a fuel tank pressure has not increased over the plateau duration. In other examples, the end of the refueling event may be indicated responsive to a refueling nozzle being removed from the fuel filler neck, replacement of a fuel cap, closing of a refueling door, etc. The fuel level and fuel tank pressure may continue to be monitored following the end of the refueling event, as described further herein.

Continuing at 525, method 500 includes monitoring the bleed-down rate (e.g., first pressure decay rate, or first bleed-down rate of fuel tank pressure). For example, a pressure bleed-down rate may be monitored by an FTPT, such as FTPT 291 as shown in FIG. 2, and compared to a threshold bleed-down rate. The threshold bleed-down rate may comprise a rate that is expected if there is no fuel in the evap recovery line(s) or other obstructions hindering bleed-down to atmospheric pressure. The bleed-down rate may be further based on the fuel fill level, canister load, etc. If the monitored pressure bleed-down rate is greater than or equal to the threshold bleed-down rate, it may be indicated at the controller that the evap recovery line(s) are free from residual fuel or other obstruction. Method 500 then proceeds to 530, and includes sealing the fuel tank responsive to the fuel tank pressure decreasing to a threshold (e.g., atmospheric pressure), for example by commanding the FTIV closed. Method 500 then proceeds to 535, where vehicle operating conditions are updated based on the refueling event. For example a dashboard fuel gage, fuel level based parameters such as miles-to-empty, a canister loading state, and a canister purge schedule may be updated. Method 500 may then end.

Returning to 525, if the pressure bleed-down rate is less than the threshold, method 500 proceeds to 540, and includes commanding open the canister purge valve (e.g., 261), commanding closed the canister vent valve (e.g., 297), and commanding closed the throttle (e.g., 262). Additionally, at 540, the fuel tank isolation valve (e.g., 252), which was maintained open during refueling, is maintained open. By opening the canister purge valve and maintaining open the fuel tank isolation valve, while commanding closed the throttle and canister vent valve, the fuel system (e.g., 218) may be coupled to the emissions control system (e.g., 251), and to the intake manifold. Proceeding to 545, method 500 includes spinning the engine unfueled in reverse. For example, an electric motor, such as a starter motor may be operated to spin the engine. The controller may be configured to disable spark and fuel injection. The engine may be spun unfueled at a predetermined speed, or the engine speed may be variable based on current operating conditions as will be discussed in further detail below. For example, the engine may be spun at a relatively low speed, for example at idling speed or lower, but may be spun at a higher speed if a larger pressure gradient is necessary. As described above with regard to FIG. 3, when the engine is spun in the reverse direction, a vacuum is generated in the exhaust system, while a pressure is generated in the intake manifold. By commanding the throttle closed, the canister purge valve open, the canister vent valve closed, and the fuel tank isolation valve open, spinning the engine unfueled in reverse may pressurize the evaporative emissions control system and fuel system.

Continuing at 550, method 500 again includes monitoring fuel tank pressure for pressure bleed-down (e.g., second pressure decay rate, or second bleed-down rate). If, after a predetermined time interval, the pressure bleed-down rate is below a threshold, method 500 proceeds to 555 where the spinning the engine unfueled in reverse is deactivated and it is indicated that there is a blockage or restriction in the evap system. Indicating a blockage or restriction in the evap system may include setting a diagnostic code or flag at the controller, and may further include illuminating a malfunction indicator lamp. Additional on-board tests may be scheduled to mitigate and/or determine the nature of the restriction. In some examples, as discussed above, the engine may be spun at a higher speed to generate a larger pressure gradient in order to attempt to mitigate the blockage or restriction in the evap system. However, a blockage or restriction from residual fuel in the evap recovery lines is unlikely due to the fact that pressurization of the evap system and fuel tank failed to restore pressure bleed-down in the evap system. Thus, the indicated restriction may be due to canister aging or blockages, air filter clogging, stuck valves, etc. For example, an air filter may be clogged due to sand, salt, spiders, etc. entering the vent line thereby restricting stripped gasses from exiting the vent line and resulting in the evap system holding pressure after a refueling event. Method 500 then proceeds to 535, where vehicle operating conditions are updated according to the commenced refueling event, and canister purging at the next engine-on event may be suspended. Furthermore, as the engine was spun in reverse for a duration, the exhaust catalyst may be below a threshold (e.g., light-off temperature) as a result of air flowing over the exhaust catalyst. Thus, at 535 method 500 may include updating the status of the exhaust catalyst and suspending canister purging, as described above, and may additionally include operating the vehicle in battery mode only operation until the light off temperature is reached. In examples wherein the vehicle is equipped with an electrical heating apparatus configured to heat the exhaust catalyst, the exhaust catalyst may be electrically heated to attain light-off temperature. Method 500 may then end.

Returning to 550, if, after a predetermined time interval, the second fuel tank pressure bleed-down rate greater than a threshold is observed, method 500 proceeds to 560 where the spinning the engine unfueled in reverse is maintained for a duration until the measured fuel tank pressure decreases to atmospheric pressure. When fuel tank pressure reaches atmospheric pressure, it is indicated that no residual fuel exists in the evap line(s) and the spinning of the engine unfueled in reverse is deactivated. As such, method 500 proceeds to 565 where the fuel tank is sealed by commanding the FTIV closed, the canister purge valve is closed, the canister vent valve is opened, and the throttle is returned to default positioning.

Continuing at 570, method 500 includes determining whether the refueling event was terminated by an automatic shut-off event. An automatic shut-off event may be indicated by a controller, such as controller 212, and may be based on fuel tank fill level, fuel tank pressure, etc. For example, a fuel tank pressure above a threshold may trigger an automatic shutoff of the refueling pump. A float valve may be coupled to a fill limit vent valve (FLVV), and configured to close the valve when the fuel level reaches a threshold. The closing of the FLVV may restrict fuel vapor from entering the evap recovery line, and may thus generate a threshold pressure within the fuel tank. Automatic shut-off events may also be triggered due to a restriction in the evap recovery lines, canister vent line, etc. A refueling event may include multiple automatic shutoff events. For example, a refueling nozzle that includes on-board vapor recovery may automatically shut off if the refueling nozzle is not coupled to the fuel filler neck properly. Further, if a refueling operator trickle fills the fuel tank following a first automatic shutoff event, an additional automatic shutoff event may occur.

If no automatic shutoff was detected, (refueling has ended as indicated by, for example, a stabilization of fuel level, removal of fuel nozzle from fuel neck, etc., method 500 may proceed to 575. At 575, method 500 includes indicating to perform one or more on-board tests to determine operation of the fuel system. As the spinning the engine unfueled in reverse cleared a restriction in the evap recovery lines, it may be inferred that the restriction was due to fuel in the evap recovery lines. As such, the restriction may have been due to overfilling due to a stuck open FLVV, a malfunctioning float valve, vapor recirculation line degradation, etc. The fuel tank fill level and fuel tank pressure during the refueling event may indicate or eliminate one or more of these possibilities, and appropriate tests may be scheduled. Method 500 may then proceed to 535, where vehicle operating conditions are updated based on the refueling event as described above. Method 500 may then end.

If an automatic-shutoff event has been detected, method 500 may proceed to 580. At 580, method 500 may include determining whether the automatic shut-off event was due to a full fuel tank. For example, method 500 may include determining whether the fuel level in the fuel tank was overfilled at the time of the automatic shutoff event. If the fuel level in the fuel tank is determined to be greater than or equal to 100% of fuel tank capacity at the time of the automatic shutoff event, method 500 may proceed to 585. At 585, method 500 includes indicating to the vehicle operator that the fuel tank was overfilled, resulting in fuel entering the evap recovery line(s). For example, a message may be presented on a dashboard panel. If multiple automatic shut-off events were detected with a full fuel tank, method 500 may further include indicating to the vehicle operator to discontinue the practice of trickle-filling a fuel tank after automatic shutoff. Method 500 then proceeds to 535, where vehicle operating conditions are updated based on the refueling event as described. Method 500 may then end.

If the fuel tank was not indicated to be full at the time of an automatic shutoff event, method 500 proceeds to 590. At 590, method 500 includes indicating an on-board test to determine whether the fuel level indicator is functioning properly. The monitored pressure and fuel level data may be analyzed to determine whether the FLI is functioning properly, and/or additional FLI testing may be indicated. Other operation testing, such as the tests described at 575, may also be indicated. Method 500 then proceeds to 535, where vehicle operating conditions are updated based on the refueling event as described. Method 500 may then end.

FIG. 6 shows an example timeline for an onboard Evap system refueling liquid carryover detection and mitigation strategy using methods described herein and with respect to FIG. 5, as applied to the systems described herein and with reference to FIGS. 1-4. Timeline 600 includes plot 605, indicating whether a refueling event is taking place over time. Timeline 600 further includes plot 610, indicating the open or closed status of a fuel tank isolation valve (e.g., FTIV 252) over time. Timeline 600 further includes plot 615, indicating fuel level in a fuel tank, measured by a fuel level sensor (e.g., fuel level sensor 234), over time. Timeline 600 further includes plot 620, indicating pressure in a fuel tank, measured by a fuel tank pressure transducer (FTPT), such as FTPT 291, over time. Line 625 indicates a threshold pressure corresponding to atmospheric pressure. Line 630 indicates a threshold fuel tank pressure decay rate expected if the evap recovery line is unrestricted. Timeline 600 further includes plot 635, indicating the flow rate of a liquid fuel from a fuel dispenser into a fuel tank over time. Timeline 600 further includes plot 640, indicating the open or closed status of a canister purge valve (e.g., 261), plot 645, indicating the open or closed status of a canister vent valve (e.g., 297), and plot 650, indicating the positioning of a throttle (e.g., 262), over time. Timeline 600 further includes plot 655, indicating whether the electric motor is operating to spin the engine in a forward direction, a reverse direction, or whether the electric motor is off, over time.

At time $t_0$ the vehicle is in an off-state. Further, at time $t_0$ a refueling event has not been requested, as indicated by plot 605, and thus the FTIV is closed, as indicated by plot 610, and there is a standing pressure in the fuel tank, as indicated by plot 620. The electric motor is off, as indicated by plot 655 and there is a static indicated level of fuel in the fuel tank, as indicated by plot 615. Accordingly, no fuel is being disbursed into the fuel tank, as indicated by plot 635. Furthermore, the canister purge valve 640 is closed, the canister vent valve 645 is open, and the throttle 650 is positioned in a state reflective of the vehicle at the time of vehicle shut-down.

At time $t_1$ a refueling event is requested, and thus the FTIV is opened such that the fuel tank may be depressurized prior to refueling. Between time $t_1$ and time $t_2$, the fuel tank pressure decays to atmospheric pressure, as represented by line 625. In some examples, the fuel cap may be unlocked after the fuel tank falls to atmospheric pressure.

At time $t_2$, refueling begins. The fuel dispenser in this example dispenses liquid fuel at a uniform rate, as shown by plot 635. Between time $t_2$ and time $t_3$, the amount of fuel in the tank increases accordingly, as shown by plot 615. As shown by plot 620, pressure in the fuel tank increases to a steady-state pressure while the fuel flow rate remains uniform.

At time $t_3$, the fuel tank reaches a predetermined maximum full fill level. Approaching the full fill level causes the fuel tank pressure to sharply increase (e.g., due to a float valve closing a fill limit vent valve). Accordingly, the rise in fuel tank pressure causes an automatic shut-off signal to be sent to the dispenser. Accordingly, the fuel dispenser is shut off as shown by plot 635, and fuel dispensing ceases. As such, between time $t_3$ and time $t_4$, fuel tank pressure is observed to decrease.

At time $t_4$, the dispenser operator attempts to trickle-fill additional fuel in the fuel tank, as shown by plot 635. Accordingly, fuel tank pressure increases, as shown by plot 620. While a small volume of fuel is added to the fuel tank the fuel level indicator is already indicating a full tank, and thus the FLI output does not markedly change. At time $t_5$ the rise in fuel tank pressure abruptly causes another automatic shut-off signal to be sent to the fuel dispenser. Accordingly, the fuel dispenser is shut off, fuel dispensing ceases, and the fuel tank pressure decreases.

At time $t_6$, the dispenser operator again attempts to trickle-fill additional fuel into the fuel tank. Accordingly, fuel tank pressure increases, and the rise in fuel tank pressure abruptly causes an automatic shut-off signal to be sent to the fuel dispenser at time t₇. Accordingly, the fuel dispenser is shut off, fuel dispensing ceases, and fuel tank pressure again begins to decrease.

At time t₇, following the final trickle-fill attempt by the dispenser operator, the refueling event ends. Between time t₇ and time t₈, the pressure in the fuel tank, as shown by plot 620 decreases at a rate substantially less than a threshold rate, shown by line 630. The threshold rate may be a rate at which pressure in the fuel tank is expected to decline following a refueling event under circumstances in which the evap line(s) are free from obstruction. At time t₈, a fuel tank pressure for an unrestricted fuel system is expected to reach atmospheric pressure. As the actual pressure is substantially greater than atmospheric pressure at time t₈, it may be inferred that fuel has entered the evap recovery line(s) as a result of dispenser operator trickle-filling the fuel tank following an automatic shutoff event. As such, at time t₈ the canister purge valve is commanded open, indicated by plot 640, the canister vent valve is commanded closed, indicated by plot 645, and the throttle is commanded closed, indicated by plot 650. Furthermore, the electric motor is commanded to spin the engine unfueled in reverse. As described above, spinning the engine unfueled in reverse may include disabling spark and fuel injection to the engine cylinders. Additionally, the FTIV is maintained open such that spinning the engine unfueled in reverse may pressurize the evap recovery lines and the fuel tank, thus returning any residual fuel in the evap recovery line(s) to the fuel tank.

Between time t₈ and time t₉, fuel tank pressure decreases while the electric motor operates to spin the engine unfueled in reverse. At time t₉ the fuel tank pressure reaches atmospheric pressure. As such, it may be indicated that the evap line(s) are free from residual fuel or other obstruction. Accordingly, the spinning of the engine unfueled in reverse is deactivated, the canister purge valve is commanded closed, the canister vent valve is commanded open, and the throttle is returned to the default position. Further, the FTIV is commanded closed. As the FTIV is closed, the fuel tank is thus isolated and pressure may again begin to build, indicated by plot 620.

In this way, liquid entering the evap recovery lines is quickly and accurately diagnosed, and mitigating actions are undertaken to return the liquid fuel to the fuel tank. As such, reduction in the efficiency of vapor canister adsorption is avoided due to liquid fuel contacting the vapor canister adsorbent material. The technical effect of detecting liquid fuel in the evap recovery line using the method described herein is to enable rapid assessment of fuel carryover such that during a subsequent drive cycle a canister purging event does not result in liquid fuel getting sucked into the vapor canister, thus corrupting the activated carbon. Furthermore, by spinning the engine unfueled in reverse in order to pressurize the evaporative emissions control system and fuel system such that fuel may be returned to the tank, an external source of pressure onboard the vehicle is not required in order to mitigate liquid fuel in the evap recovery line thus saving costs and space in the vehicle.

The systems described herein and with reference to FIGS. 1-4, along with the methods described herein and with reference to FIG. 5 may enable one or more systems and one or more methods. In one example, a method comprises during refueling a tank which supplies fuel to a combustion engine, venting the tank to atmosphere through a vapor storage system, and after refueling and when pressure decay in the tank is less than a threshold, sealing the vapor storage system from atmosphere and running the engine un-fueled in reverse to force air from an intake manifold of the engine through the vapor storage system into the tank. In a first example of the method, the method includes wherein pressure decay in the tank after refueling comprises a first pressure decay rate, and wherein pressure decay in the tank while running the engine in reverse comprises a second pressure decay rate, and further comprising continuing to run the engine in reverse until pressure in the tank decreases to atmospheric pressure when the second pressure decay rate is greater than another threshold. A second example of the method optionally includes the first example and further comprises coupling and uncoupling the tank to the vapor storage system through a fuel tank isolation valve, selectively coupling the intake manifold of the engine to atmosphere through a throttle; selectively coupling a vapor storage canister in the vapor storage system to the intake manifold of the engine through a canister purge valve; selectively coupling the canister to atmosphere through a canister vent valve; and wherein running the engine unfueled in reverse further comprises opening the fuel tank isolation valve, closing the throttle, opening the canister purge valve, and closing the canister vent valve. A third example of the method optionally includes any one or more or each of the first and second examples and further comprises purging fuel vapors stored in a vapor adsorbent, which is housed in the canister, into the engine intake manifold under predetermined engine operating conditions, and said purging further comprising: commanding open the canister purge valve, maintaining closed the fuel tank isolation valve, and commanding open or maintaining open the canister vent valve to direct air through the vapor storage system to the intake manifold to purge the vapor storage system and fuel vapor canister of hydrocarbons. A fourth example of the method optionally includes any one or more or each of the first through third examples and further comprises responsive to the second pressure decay rate being greater than a threshold, determining whether the refueling event included an automatic shutoff of a refueling dispenser which is temporarily coupled to the fuel tank; and responsive to determining that the refueling event did not include an automatic shutoff of the refueling dispenser, indicating to perform one or more on-board tests to determine an operating condition of a fuel system which includes the fuel tank. A fifth example of the method optionally includes any one or more or each of the first through fourth examples and further comprises responsive to determining that the refueling event did include an automatic shutoff of a refueling dispenser, determining whether a fuel level indicator housed within the tank indicates that the tank is full; and responsive to determining that the fuel level indicator indicates that the tank is full, indicating that the fuel tank was overfilled. A sixth example of the method optionally includes any one or more or each of the first through fifth examples and further comprises responsive to determining that the fuel level indicator indicates that the tank is not full, indicating an on-board test to determine an operating condition of the fuel level indicator. A seventh example of the method optionally includes any one or more or each of the first through sixth examples and further comprises responsive to the second pressure decay rate being less than the threshold, deactivating the spinning the engine in reverse; and indicating a restriction in the vapor storage system. An eighth example of the method optionally includes any one or more or each of the first through seventh examples and further comprises responsive to indicating a restriction in the vapor storage system, suspending purging of the fuel vapor canister at a subsequent engine-on event.

Another example of a method comprises during refueling a tank housed within a fuel system which supplies fuel to a combustion engine, venting the tank to atmosphere through a vapor storage system coupled to the fuel system via one or more vapor recovery lines; and responsive to a pressure bleed-down rate in the tank less than a threshold after refueling the tank: indicating the presence of fuel in the one or more vapor recovery lines; and actively returning the fuel from the one or more vapor recovery lines to the tank. In a first example of the method, the method further comprises selectively coupling the tank to the vapor storage system through a fuel tank isolation valve; selectively coupling an intake manifold of the engine to atmosphere through a throttle; selectively coupling a vapor storage canister in the vapor storage system to the intake manifold of the engine through a canister purge valve; selectively coupling the vapor storage system to atmosphere through a canister vent valve; and wherein actively returning the fuel to the tank comprises: opening the fuel tank isolation valve, closing the throttle, opening the canister purge valve, closing the canister vent valve; and running the engine unfueled in reverse to force air from the intake manifold of the engine through the vapor storage system into the tank. A second example of the method optionally includes the first example and further includes wherein the pressure bleed-down rate in the tank after refueling the tank comprises a first pressure bleed-down rate, and wherein pressure bleed-down rate in the tank while running the engine unfueled in reverse comprises a second pressure bleed-down rate; and further comprising continuing to run the engine in reverse until pressure in the tank decreases to atmospheric pressure when the second pressure decay rate is greater than another threshold. A third example of the method optionally includes any one or more or each of the first and second examples and further comprises deactivating the running the engine unfueled in reverse responsive to the second pressure bleed-down rate being less than a threshold; and indicating a restriction in the one or more vapor recovery lines. A fourth example of the method optionally includes any one or more or each of the first through third examples and further comprises purging fuel vapors stored in a vapor adsorbent, which is housed in the canister, into the engine intake manifold under predetermined engine operating conditions; said purging further comprising: commanding open the canister purge valve, maintaining closed the fuel tank isolation valve, and commanding open or maintaining open the canister vent valve to direct air through the vapor storage system to the intake manifold to purge the vapor storage system and fuel vapor canister of hydrocarbons; and responsive to indicating a restriction in the one or more vapor recovery lines, suspending the purging of the vapor storage system and fuel vapor canister at a subsequent engine-on event. A fifth example of the method optionally includes any one or more or each of the first through fourth examples and further includes wherein the refueling event comprises one or more automatic shutoffs of a refueling dispenser. A sixth example of the method optionally includes any one or more or each of the first through fifth examples and further comprises indicating a tank fill level by a fuel level indicator housed within the tank; indicating whether the tank is full responsive to the one or more automatic shutoffs of the refueling dispenser during the refueling event; and responsive to determining that the tank is not full, indicating tests to determine how the fuel level indicator is operating. A seventh example of the method optionally includes any one or more or each of the first through sixth examples and further comprises responsive to the first pressure bleed-down rate being greater than the threshold, sealing the fuel tank responsive to a fuel tank pressure decreasing to atmospheric pressure.

An example of a vehicle system comprises a fuel tank coupled to a fuel vapor canister via a one or more vapor recovery lines; a fuel tank isolation valve coupled between the fuel tank and the fuel vapor canister; a canister purge valve coupled between the fuel vapor canister and an engine intake manifold; a throttle coupled between fresh air and the engine intake manifold in an intake passage; a canister vent valve coupled between the fuel vapor canister and fresh air within a vent line; a fuel tank pressure sensor; a fuel tank fill level sensor; and a controller storing instructions in non-transitory memory, that when executed, cause the controller to: open the fuel tank isolation valve in response to a request for a refueling event; monitor a fuel tank pressure via the fuel tank pressure sensor and a fuel tank fill level via the fuel tank fill level sensor for a duration of the refueling event; indicate liquid fuel carryover into the one or more vapor recovery lines responsive to a fuel tank pressure decay rate following the refueling event being less than a threshold. In a first example, the system further comprises an engine comprising one or more cylinders, each cylinder comprising an intake valve and an exhaust valve; an engine exhaust; an electric motor configured to run the engine; and a controller configured with instructions stored in non-transitory memory, that when executed cause the controller to: run the engine in reverse to direct atmospheric air into the fuel tank in response to an indication of liquid fuel carryover into the one or more vapor recovery lines. A second example of the system optionally includes the first example and further includes wherein the controller further stores instructions in non-transitory memory, that when executed, cause the controller to: indicate a restriction in the one or move vapor recovery lines in response to pressure in the tank not decreasing above a threshold rate when running the engine in reverse.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
during refueling a tank which supplies fuel to a combustion engine, venting the tank to atmosphere through a vapor storage system; and
after refueling and when pressure decay in the tank is less than a threshold, sealing the vapor storage system from atmosphere and running the engine un-fueled in reverse with an electric motor to force air from an intake manifold of the engine through the vapor storage system into the tank, wherein pressure decay in the tank after refueling comprises a first pressure decay rate, and wherein pressure decay in the tank while running the engine in reverse comprises a second pressure decay rate; and
further comprising continuing to run the engine in reverse until pressure in the tank decreases to atmospheric pressure when the second pressure decay rate is greater than another threshold.

2. The method of claim 1, further comprising:
coupling and uncoupling the tank to the vapor storage system through a fuel tank isolation valve;
selectively coupling the intake manifold of the engine to atmosphere through a throttle;
selectively coupling a vapor storage canister in the vapor storage system to the intake manifold of the engine through a canister purge valve; and
selectively coupling the vapor storage canister to atmosphere through a canister vent valve;
wherein running the engine un-fueled in reverse further comprises opening the fuel tank isolation valve, closing the throttle, opening the canister purge valve, and closing the canister vent valve.

3. The method of claim 2, further comprising:
purging fuel vapors stored in a vapor adsorbent, which is housed in the vapor storage canister, into the intake manifold under predetermined engine operating conditions; and
said purging further comprising: commanding open the canister purge valve, maintaining closed the fuel tank isolation valve, and commanding open or maintaining open the canister vent valve to direct air through the vapor storage system to the intake manifold to purge the vapor storage system and a fuel vapor canister of hydrocarbons.

4. The method of claim 3, further comprising:
responsive to a second pressure decay rate being less than the threshold, deactivating spinning the engine in reverse; and
indicating a restriction in the vapor storage system.

5. The method of claim 4, further comprising:
responsive to indicating the restriction in the vapor storage system, suspending purging of the fuel vapor canister at a subsequent engine-on event.

6. The method of claim 1, further comprising:
responsive to the second pressure decay rate being greater than a threshold, determining whether the refueling included an automatic shutoff of a refueling dispenser which is temporarily coupled to the tank; and
responsive to determining that the refueling did not include the automatic shutoff of the refueling dispenser, indicating to perform one or more on-board tests to determine an operating condition of a fuel system which includes the tank.

7. The method of claim 6, further comprising:
responsive to determining that the refueling did include the automatic shutoff of the refueling dispenser, determining whether a fuel level indicator housed within the tank indicates that the tank is full; and
responsive to determining that the fuel level indicator indicates that the tank is full, indicating that the tank was overfilled.

8. The method of claim 7, further comprising:
responsive to determining that the fuel level indicator indicates that the tank is not full, indicating an on-board test to determine an operating condition of the fuel level indicator.

9. A method comprising:
during refueling a tank which supplies fuel to a combustion engine, venting the tank to atmosphere through a vapor storage system;
after refueling and when pressure decay in the tank is less than a threshold, sealing the vapor storage system from atmosphere and running the engine un-fueled in reverse with an electric motor to force air from an intake manifold of the engine through the vapor storage system into the tank;
coupling and uncoupling the tank to the vapor storage system through a fuel tank isolation valve;
selectively coupling the intake manifold of the engine to atmosphere through a throttle;
selectively coupling a vapor storage canister in the vapor storage system to the intake manifold of the engine through a canister purge valve; and
selectively coupling the vapor storage canister to atmosphere through a canister vent valve;
wherein running the engine un-fueled in reverse further comprises opening the fuel tank isolation valve, closing the throttle, opening the canister purge valve, and closing the canister vent valve.

10. The method of claim 9, wherein pressure decay in the tank after refueling comprises a first pressure decay rate, and wherein pressure decay in the tank while running the engine in reverse comprises a second pressure decay rate; and further comprising continuing to run the engine in reverse until pressure in the tank decreases to atmospheric pressure when the second pressure decay rate is greater than another threshold.

11. The method of claim 10, further comprising:
responsive to the second pressure decay rate being greater than a threshold, determining whether the refueling included an automatic shutoff of a refueling dispenser which is temporarily coupled to the tank; and
responsive to determining that the refueling did not include the automatic shutoff of the refueling dispenser, indicating to perform one or more on-board tests to determine an operating condition of a fuel system which includes the tank.

12. The method of claim 11, further comprising:
responsive to determining that the refueling did include the automatic shutoff of the refueling dispenser, determining whether a fuel level indicator housed within the tank indicates that the tank is full; and
responsive to determining that the fuel level indicator indicates that the tank is full, indicating that the tank was overfilled.

13. The method of claim 12, further comprising:
responsive to determining that the fuel level indicator indicates that the tank is not full, indicating an on-board test to determine an operating condition of the fuel level indicator.

14. The method of claim 13, further comprising:
responsive to a second pressure decay rate being less than the threshold, deactivating spinning the engine in reverse; and
indicating a restriction in the vapor storage system.

15. The method of claim 14, further comprising:
responsive to indicating the restriction in the vapor storage system, suspending purging of the fuel vapor canister at a subsequent engine-on event.

16. The method of claim 9, further comprising:
purging fuel vapors stored in a vapor adsorbent, which is housed in the vapor storage canister, into the intake manifold under predetermined engine operating conditions; and
said purging further comprising: commanding open the canister purge valve, maintaining closed the fuel tank isolation valve, and commanding open or maintaining open the canister vent valve to direct air through the vapor storage system to the intake manifold to purge the vapor storage system and a fuel vapor canister of hydrocarbons.

* * * * *